United States Patent
Okana et al.

(10) Patent No.: US 6,640,418 B2
(45) Date of Patent: Nov. 4, 2003

(54) METHOD OF MANUFACTURING A HEAD UNIT

(75) Inventors: Tetsuya Okana, Osaka (JP); Mitsuhisa Fujiki, Nara (JP); Satoshi Yamabayashi, Osaka (JP); Shinya Ogasawara, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 97 days.

(21) Appl. No.: 09/890,476

(22) PCT Filed: Nov. 29, 2000

(86) PCT No.: PCT/JP00/08459

§ 371 (c)(1),
(2), (4) Date: Jul. 31, 2001

(87) PCT Pub. No.: WO01/41134

PCT Pub. Date: Jun. 7, 2001

(65) Prior Publication Data
US 2002/0178579 A1 Dec. 5, 2002

(30) Foreign Application Priority Data
Dec. 3, 1999 (JP) .......................... 11-344480

(51) Int. Cl.⁷ ..................... G11B 5/127; H04R 31/00
(52) U.S. Cl. .................. 29/603.11; 29/835; 360/122; 360/271.5
(58) Field of Search .................. 29/603.07, 603.08, 29/603.09, 603.1, 603.11, 603.12, 603.13, 603.14, 603.15, 835; 451/8; 360/121, 122, 241.1, 241.2, 271.5

(56) References Cited
U.S. PATENT DOCUMENTS 5,130,875 A * 7/1992 Ono et al. ............... 360/271.5
5,978,185 A * 11/1999 Abe et al. ................ 360/122
6,233,812 B1   5/2001 Fujiki et al. .............. 29/603.06

FOREIGN PATENT DOCUMENTS

| JP | 55-135327 | 10/1980 |
| JP | 61-194607 | 8/1986 |
| JP | 3-49004 | 3/1991 |
| JP | 4-42412 | 2/1992 |
| JP | 6-301916 | 10/1994 |
| JP | 7-176013 | 7/1995 |
| JP | 9-212810 | 8/1997 |
| JP | 9-231512 | 9/1997 |
| JP | 10-247309 | 9/1998 |

* cited by examiner

Primary Examiner—Peter Vo
Assistant Examiner—Donghai Nguyen
(74) Attorney, Agent, or Firm—Merchant & Gould, P.C.

(57) ABSTRACT

In processing a head unit in which a head relative height Y is Y' with a grinding amount ΔGD of ΔGD', the relationship between distances Bo between a vertex of a curved surface as a front face of a head chip and a head gap before and after grinding the front face of the head chip and a gap depth dimension GD, is predetermined with respect to a head unit in which the head relative height is substantially equal to Y', through which Bo1 as the value of Bo before grinding corresponding to a target value of the value of Bo after grinding is determined and used as Bo1 of the head unit in which the head relative height Y is Y'. Thus, grinding of the front face of the head chip is conducted after Bo1 corresponding to the target value is determined. Hence, a head unit with the value of Bo after grinding falling within the range of standard values can be manufactured efficiently, and accordingly the yield can be improved.

5 Claims, 6 Drawing Sheets

METHOD OF MANUFACTURING A HEAD UNIT

This application is a National Stage filed under 35 U.S.C. 371 of PCT/JP00/08459 on Nov. 29, 2000.

TECHNICAL FIELD

The present invention relates to a method of manufacturing a head unit of a magnetic head to be mounted in a magnetic recording/reproducing apparatus such as a VTR.

BACKGROUND ART

A conventional method of manufacturing a head unit will hereinafter be described with reference to the appended figures. FIG. 3 is a side view of an example of a conventional head unit. As shown in FIG. 3, two right and left head chips 2 and 3 (hereinafter referred to as "chips") are bonded to a base 1. The chips 2 and 3 are formed of pairs of metal plates (cores) 5 and 6, respectively. Each pair is formed of two metal plates joined to each other and a coil 4 is wound around each metal plate.

Gaps 7 and 8 are gaps formed in the joints between the metal plates 5 and the metal plates 6 of the respective chips. Curved surfaces 2a and 3a are formed as the front faces of the chips 2 and 3. Gaps on the curved surfaces 2a and 3a are head gaps 7a and 8a, respectively. In the figure, GD indicates a gap depth dimension of the gaps 7 and 8 in the side portions of the chips 2 and 3.

The base 1 eventually is attached to a rotating cylinder (not shown in the figure), and the curved surfaces 2a and 3a of the front faces of the chips 2 and 3 slide on a magnetic tape. Numeral 9 indicates a rotation center of the rotating cylinder.

FIG. 4A is a front view of an example of chip front faces before they are ground. Though the following description is directed to the chip 3, the same is true for the chip 2. Numeral 10 indicates contour lines of the curved surface 3a of the chip 3, more specifically, contour lines of the curved surface 3a when the head gap 8a is seen from an extension of a straight line 11 extending between the head gap 8a and the rotation center 9 of the rotating cylinder as shown in FIG. 3. Numeral 12 indicates a vertex of the curved surface 3a. The vertex 12 corresponds to a center of the contour lines 10. Bo indicates a distance between the vertex 12 and the head gap 8a. Y indicates a difference of heights between the chip 2 and the chip 3 from a chip-attached surface 1a of the base 1, namely, a relative height (hereinafter referred to as "a head relative height") of the two chips 2 and 3. In other words, the head relative height corresponds to a difference in level between the chips in a direction orthogonal to a chip-traveling direction.

FIG. 5 is a perspective view showing a chip grinding process. In the grinding process, a head unit 13 including the chips 2 and 3 is installed in a rotating drum 14. Accordingly, the chips 2 and 3 rotate coincidentally with the rotating drum 14 (rotating in a direction indicated by an arrow b). The front faces of the chips 2 and 3 are ground during rotation with a grinding tape 15 brought into contact therewith. Since the grinding is carried out with the grinding tape 15 traveling vertically, the front faces of the chips are ground always with an unused surface of the grinding tape 15.

In such a grinding process, as shown in FIG. 4A, the vertex 12 as a reference used to indicate Bo shifts in a direction indicated by an arrow a depending on the grinding amount. FIG. 4B shows a state where the grinding of the chip front faces is completed after the foregoing grinding process. A comparison of FIGS. 4A and 4B shows that the vertex 12 in FIG. 4B shifts in the arrow a direction. In the figures, S indicates a shift amount of the vertex 12 during the grinding.

The portion of the vertex 12 is to be brought into an excellent state of contact with a magnetic tape. Thus, it is preferable that the vertex 12 be as close to the head gaps 7a and 8a as possible. Ideally, the vertex 12 falls on the head gaps 7a and 8a, namely, Bo=0. Hence, Bo is a key factor affecting magnetic head performance, and thus, in the manufacturing process, it is necessary to selectively use a magnetic head in which Bo falls within the range of predetermined standard values that meet a required level of performance.

However, in the conventional manufacturing method as mentioned above, the shift amount S of the vertex 12 varies depending on the type of a head unit, and thus it is difficult to make the value of Bo fall in a target range. This has been a factor allowing the manufacturing yield to be decreased.

DISCLOSURE OF THE INVENTION

This invention is intended to solve the conventional problem as mentioned above. It is an object of the present invention to provide a method of manufacturing a head unit, wherein a predetermined distance is obtained between a vertex of a curved surface as a chip front face and a head gap after the chip front face is ground.

In order to achieve the above object, a method of manufacturing a head unit with a plurality of head chips mounted on one base according to the present invention is characterized as follows. That is, with respect to a head chip of the plurality of head chips fixed to the base, assume a distance between a vertex of a curved surface as a front face of the head chip and a head gap is indicated as Bo, a gap depth dimension in the head chip as GD, a value of Bo before grinding the front face of the head chip as Bo1, a value of Bo after grinding the front face as Bo2, a value of GD before grinding the front face of the head chip as GD1, a value of GD after grinding the front face as GD2, a grinding amount corresponding to a difference between GD1 and GD2 as $\Delta$GD, and a head relative height that is a difference in height from the base between two adjacent head chips of the plurality of head chips as Y, in processing the head chips in which the head relative height Y is Y' with the grinding amount $\Delta$GD of $\Delta$GD', a value of Bo1 corresponding to a target value of Bo2 is determined through: a relationship between Bo and GD that has been determined with respect to a head unit in which the head relative height is substantially equal to Y'; the target value of Bo2; and the value of $\Delta$GD', and the value of Bo1 thus determined is used as Bo1 of the head chips in which the head relative height Y is Y'.

According to the foregoing method of manufacturing a head unit, grinding of the front faces of the head chips is conducted after Bo1 corresponding to the target value of Bo2 is determined. Hence, a head unit with the value of Bo2 falling within the range of standard values can be manufactured efficiently, and accordingly the yield can be improved.

In the foregoing method of manufacturing a head unit, it is preferable that the relationship between Bo and GD be predetermined in a form of a characteristic straight line. The foregoing method of manufacturing a head unit allows the value of Bo1 corresponding to the target value of Bo2 to be determined easily through a relative formula of the characteristic straight line, the target value of Bo2 and $\Delta$GD.

Furthermore, it is preferable that the characteristic straight line is a straight line showing a correlation between coordinate axes determined using a distribution of coordinates (GD1, Bo1) and (GD2, Bo2).

Furthermore, preferably, the target value of Bo2 is zero. According to the foregoing method of manufacturing a head unit, the value of Bo1 is determined with the target value of Bo2 set to zero as an ideal value, so that the value of Bo2 easily distributes itself in the vicinity of zero, and thus the yield can be improved. This provides an advantageous manufacturing method.

Furthermore, preferably, the head chip before grinding the front face is so formed that a target value of the distance between the vertex of the curved surface as the front face of the head chip and the head gap before the head chip is fixed to the base is set to the value of Bo1 corresponding to the target value of Bo2. The foregoing method of manufacturing a head unit allows the value of Bo1 to be obtained with high accuracy by bonding the chips to the base with as little inclination as possible.

Furthermore, preferably, in fixing the head chip to the base, a fixing angle of the head chip is adjusted so that Bo1 in the head chip is the value of Bo1 corresponding to the target value of Bo2. According to the foregoing method of manufacturing a head unit, variations caused during processing of a head chip before being fixed to a base can be adjusted through a fixing angle adjustment, and accordingly the accuracy of the value of Bo1 can be improved.

BEST MODE FOR CARRYING OUT THE INVENTION

An embodiment of the present invention will hereinafter be described with reference to the figures. This embodiment employs the same basic configuration of a head unit and the same grinding process as those explained with reference to FIGS. 3 to 5. Hence, the present embodiment also will be described with reference to the same figures with the duplicate descriptions omitted. In the following description, with respect to a head chip fixed to a base, a distance between a vertex of a curved surface as a chip front face and a head gap is referred to as Bo, and a gap depth dimension is referred to as GD. With respect to Bo, a value before grinding is referred to as Bo1 and a value after grinding is referred to as Bo2. With respect to GD, a value before grinding is referred to as GD1 and a value after grinding is referred to as GD2.

According to the present invention, it was found that a relationship between Bo and GD varied with a head relative height. The present invention enables Bo1 serving as a target value of Bo2 to be set using the relationship. The present invention will be described in detail through experimental results in the following.

Figure 3:
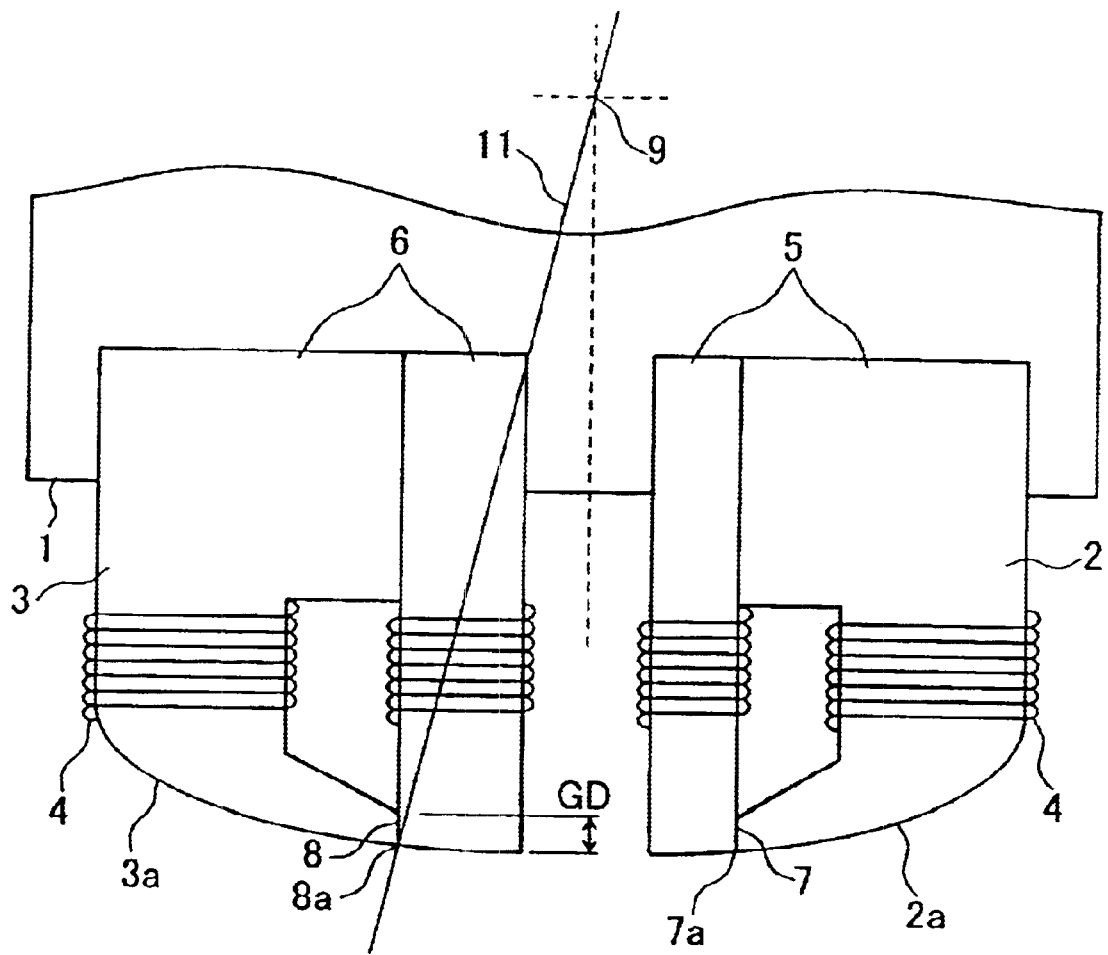
FIG. 3 is a side view of an example of a head unit.

Fifteen samples of a head unit as shown in FIG. 3 were prepared. With respect to each sample, GD and Bo before and after grinding were measured. The grinding was conducted through the grinding method as explained with reference to FIG. 5. The results are shown in the following Table 1.

TABLE 1

| No. | Relative Height Y | GD1 (Upper Column) GD2 (Lower Column) | Bo1 (Upper Column) Bo2 (Lower Column) | Relative Height Average |
|---|---|---|---|---|
| Group 1 | | | | |
| 1 | 0.8 | 15.9 | 18.7 | 2.6 |
|   |     | 8.6  | −33.7 |    |
| 2 | 2.4 | 15.2 | 15.6 |    |
|   |     | 8.1  | −35.5 |    |
| 3 | 3.4 | 14.8 | 5.1  |    |
|   |     | 7.3  | −49.8 |    |
| 4 | 2.1 | 15.2 | 15.5 |    |
|   |     | 8.3  | −28.0 |    |
| 5 | 2.7 | 14.9 | 10.5 |    |
|   |     | 7.2  | −50.0 |    |
| 6 | 3.9 | 14.3 | 8.7  |    |
|   |     | 6.2  | −62.1 |    |
| Group 2 | | | | |
| 7 | 17.4 | 15.0 | 9.3 | 17.6 |
|   |      | 8.3  | −9.2 |     |
| 8 | 18.9 | 13.7 | 11.5 |    |
|   |      | 7.2  | −7.5 |    |
| 9 | 15.5 | 14.8 | 19.5 |    |
|   |      | 7.7  | 0.0  |    |
| 10 | 20.1 | 15.3 | 10.7 |   |
|    |      | 7.5  | −2.5 |   |
| 11 | 17.1 | 15.3 | 9.5  |   |
|    |      | 7.6  | −23.8 |  |
| 12 | 16.8 | 15.5 | 7.3  |   |
|    |      | 9.5  | −12.3 |  |
| Group 3 | | | | |
| 13 | 35.3 | 14.4 | 20.5 | 37.7 |
|    |      | 7.0  | 23.0 |     |
| 14 | 37.2 | 12.5 | 41.0 |    |
|    |      | 7.4  | 31.6 |    |
| 15 | 40.5 | 13.9 | 17.0 |    |
|    |      | 7.5  | 17.5 |    |

Each value ($\mu$m) of GD1, GD2, Bo1 and Bo2 in Table 1 is an average value of those in the right and left chips. Groups 1 to 3 are three categories into which the respective samples are classified depending on the value of the head relative height Y.

Figure 1:
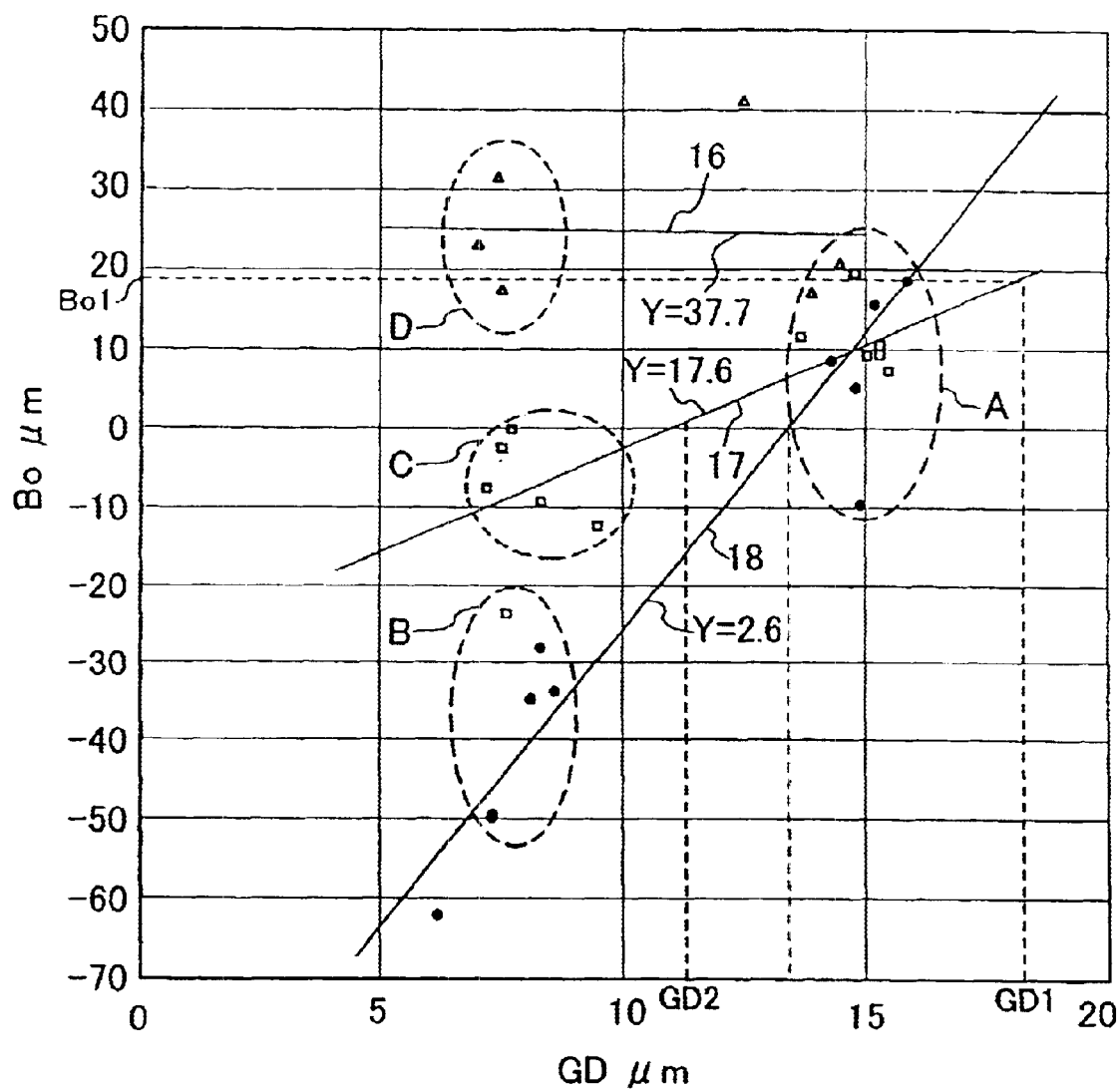
FIG. 1 is a graph showing characteristic straight lines representing relationships between GD and Bo with respect to each head relative height Y according to an embodiment of the present invention.

FIG. 1 shows the relationship between GD and Bo with respect to these samples. The graph shown in FIG. 1 was prepared by plotting the values of (GD1, Bo1) and (GD2, Bo2) of each sample shown in Table 1 with horizontal axis and vertical axis indicating GD and Bo, respectively.

As is apparent from the distribution shown in FIG.1, while most of the values (GD1, Bo1), i.e. data before grinding are distributed in an area A, the values (GD2, Bo2), i.e. data after grinding are distributed in three separate distribution areas B, C and D.

More specifically, although Bo varies with decrease in GD (with increase in grinding amount), the variation is not always constant even when the grinding amount is constant but corresponds to the value of the head relative height Y.

That is, as described above, there is a correlation between GD and Bo for each head relative height. The relationship between GD and Bo per group can be expressed approximately by a linear function. In FIG. 1, lines 16 to 18 are approximation straight lines showing the relationship between GD and Bo per group through a least square method. Function formulae for the lines 16 to 18 are expressed by the following formulae (1) to (3):

$Bo=-0.046GD+25.6$    Formula (1)

$Bo=2.7\ GD-30.4$    Formula (2)

$Bo=7.6\ GD-101.7$.    Formula (3)

A comparison of these lines shows that the tilt of the straight line increases with the decrease in the head relative height Y. The tilt of the straight line can be expressed by $(Bo1-Bo2)/(GD1-GD2)$, and the value thereof indicates the variation in Bo per micrometer of the grinding amount.

Accordingly, it can be said that the variation in Bo decreases with the increase in the head relative height Y (with the increase in difference in level between the two chips). Conceivably, this is because as the head relative height Y increases, a grinding tape can get more easily into a space between the two chips. The following is a description of this with reference to FIG. 6.

Figure 6A:
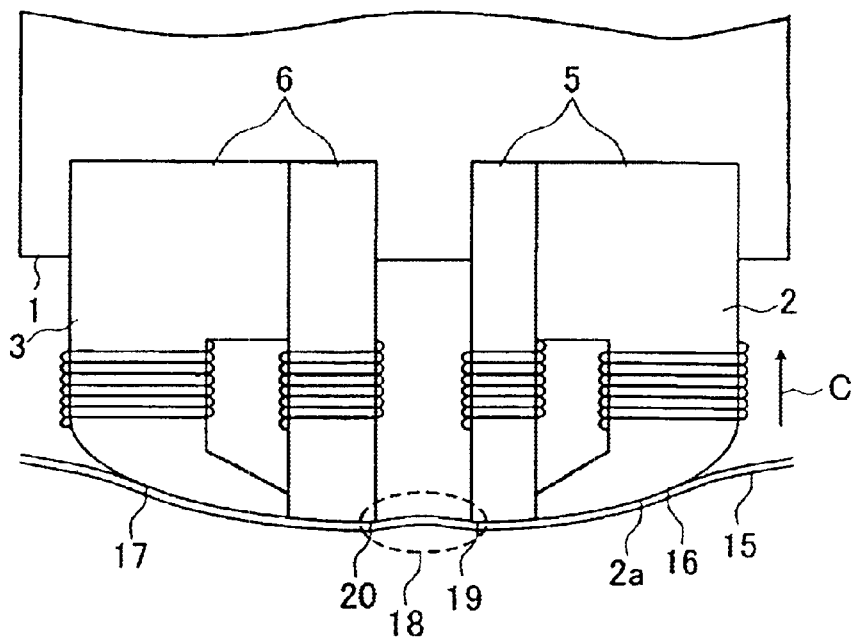
FIG. 6A is a side view of an example of a head unit during a grinding process.

In a grinding process, a grinding tape 15 is in contact with and along chip front faces as shown in FIG. 6A. The grinding tape 15 is pressed against the chip front face along the shape, and thus is allowed to be in contact, at a sufficiently high contact pressure, with outer side portions 16 and 17 of the chip front faces formed continuously in a direction (indicated with an arrow c) in which the curved surfaces recede from the grinding tape 15.

Figure 6B:
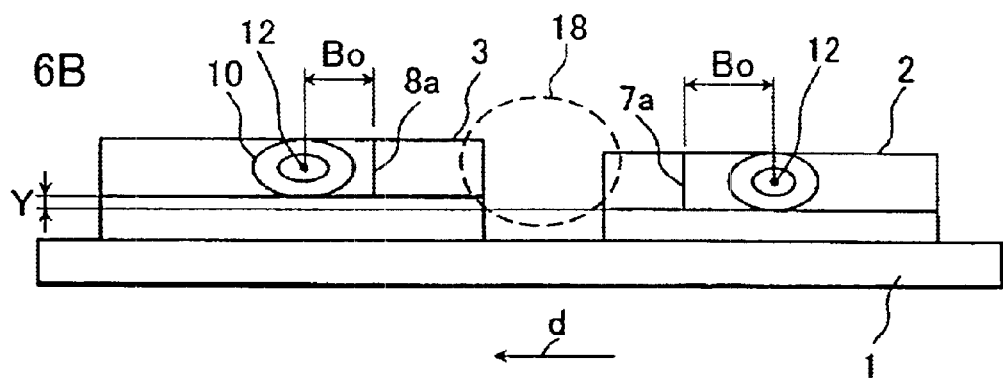
FIG. 6B is a front view of the example of a head unit during the grinding process.

In the case where the head relative height Y is small as shown in FIG. 6B, the surfaces of chips 2 and 3 in contact with the grinding tape 15 are positioned substantially in the same level in a chip rotation direction (indicated with an arrow d). This makes it difficult for the grinding tape 15 to get into a portion 18 between the two chips. Hence, the contact pressure at which the grinding tape 15 is in contact with inner side portions 19 and 20 of the chip front faces is lower than that with the outer side portions 16 and 17 of the chip front faces.

Accordingly, in the grinding process, a grinding amount of the outer side portions 16 and 17 of the chip front faces is larger than that of the inner side portions 19 and 20 of the chip front faces. Owing to the difference in grinding amount, the shapes of the chip front faces can be changed easily, so that the shift amount of a vertex 12 can be increased.

Figure 6C:
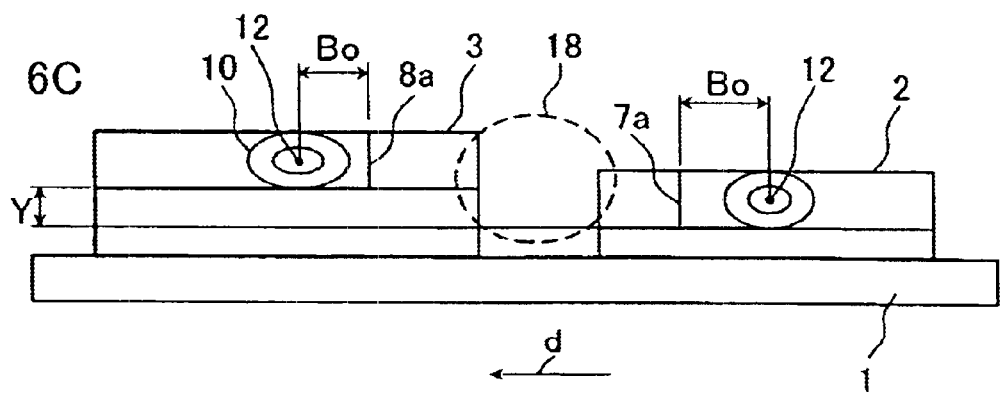
FIG. 6C is a front view of another example of a head unit during a grinding process.

On the contrary, in the case where the value of the head relative height Y between the chips 2 and 3 is large as shown in FIG. 6C, the surfaces of the chips 2 and 3 in contact with the grinding tape 15 are shifted in level with respect to each other in the chip rotation direction. This makes it easier for the grinding tape 15 to get into the portion 18 between the chips during the rotation.

Presumably, a sufficiently high contact pressure thus can be secured between the inner side portions 19 and 20 of the chip front faces and the grinding tape 15 and, therefore, can be secured both in the outer side portions 16 and 17 of the chip front faces and the inner side portions 19 and 20 of the chip front faces, so that the grinding amount can be substantially uniform throughout the chip front faces.

In this case, a sufficiently high contact pressure is secured across the chip front faces. Thus, the gap depth portion also can be ground sufficiently and the grinding amount can be substantially uniform across the chip front faces, so that the original shapes of the chip front faces can be maintained relatively even after the progress of grinding. As in this case, when variation in shape of the chip front faces is small, the shift amount of the vertex 12 caused during grinding also is small.

The accuracy of Bo2 can be improved using the relationship between GD and Bo in correspondence with the head relative height Y. According to FIG. 1, Bo1 can be determined using three parameters: the head relative height Y, Bo2 and the grinding amount $\Delta GD$ (GD1-GD2). With Bo1 thus obtained, Bo2 can be set to a predetermined value.

A specific example will be described with reference to the straight line 17. In the samples used for the calculation of data for the line 17, an average value of the head relative height Y is 17.6 $\mu$m (Table 1). Accordingly, when the set value of the head relative height Y is, for instance, 17 $\mu$m in the vicinity of 17.6 $\mu$m, the line 17 is used.

The optimum value of Bo2 is zero regardless of the head relative height Y In FIG. 3, the value of GD at a point of intersection of the line 13 and Bo being zero can be determined by substituting zero for Bo in the formula (2), which results in GD2=11.3 $\mu$m.

In the case where the set value of the grinding amount $\Delta GD$ is 7 $\mu$m, the gap depth dimension GD1 before grinding is expressed by (GD2+$\Delta GD$) and thus is 18.3 $\mu$m. By substituting this value for GD in the formula (2), Bo of 19.0 $\mu$m is obtained and this value corresponds to Bo1. Hence, in the state where both chips are attached to a head unit, if Bo1=19.0 $\mu$m, the head unit can be obtained in which in theory, Bo2=0 after grinding carried out to obtain a grinding amount of 7 $\mu$m.

However, the respective formulae are approximation formulae and there are, for instance, variations in Bo1 due to variations caused during processing and the difference in grinding amount between right and left chips. Thus, it is not always possible to obtain ideal chips with Bo2 being zero. Yet the value of Bo2 is required only to be within the range of predetermined standard values, for instance, -50 $\mu$m to +50 $\mu$m. The foregoing optimization allows the value of Bo2 to fall in such a range at a higher rate, and accordingly the yield can be improved.

With respect to the setting of Bo1, there is a method in which a target value of the distance between a vertex of a curved surface as a chip front face and a head gap in forming and processing chips before grinding of the chip front faces (before the chips are bonded to a base) is set to the value of the distance Bo1 determined in the previously described manner. This method allows the value of Bo1 to be obtained with high accuracy when the chips are bonded to the base with as little inclination as possible. Thus, when both chips are bonded to the base and then are subjected to grinding, the value of Bo2 falls within the range of standard values at a higher rate, and accordingly a sufficiently high yield can be secured.

Even in the case where variations in Bo2 due to variations caused during processing are great and accordingly the accuracy in Bo1 is low, the yield can be prevented from being degraded through adjustment of the fixing angle of the chip when the chip is bonded to the base.

Figure 4A:
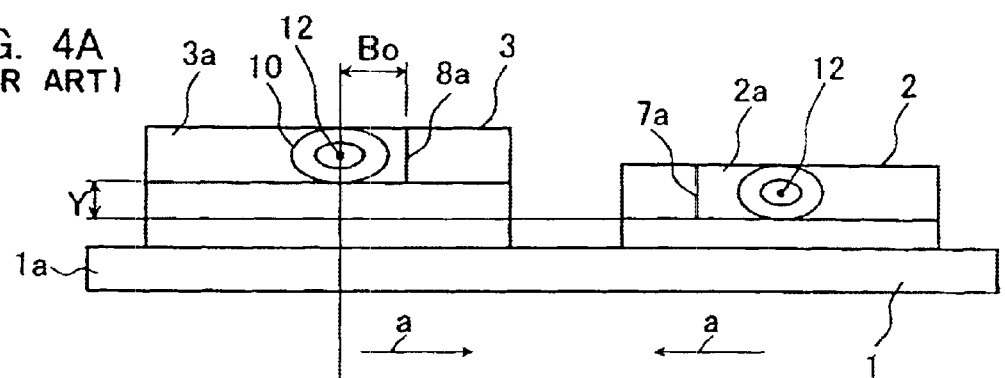
FIG. 4A is a front view of an example of chip front faces before being ground.
Figure 4B:
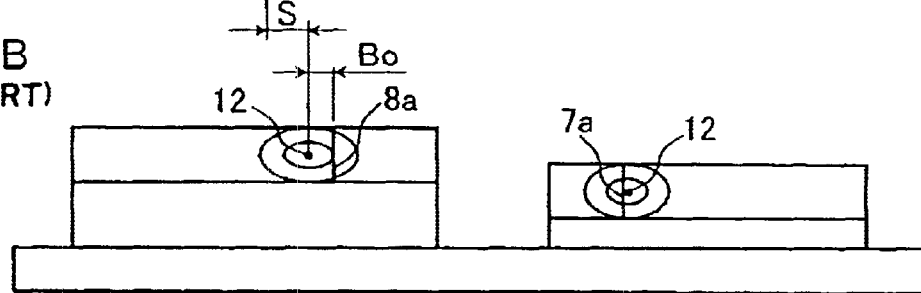
FIG. 4B is a front view of the example of chip front faces after being ground.
Figure 5:
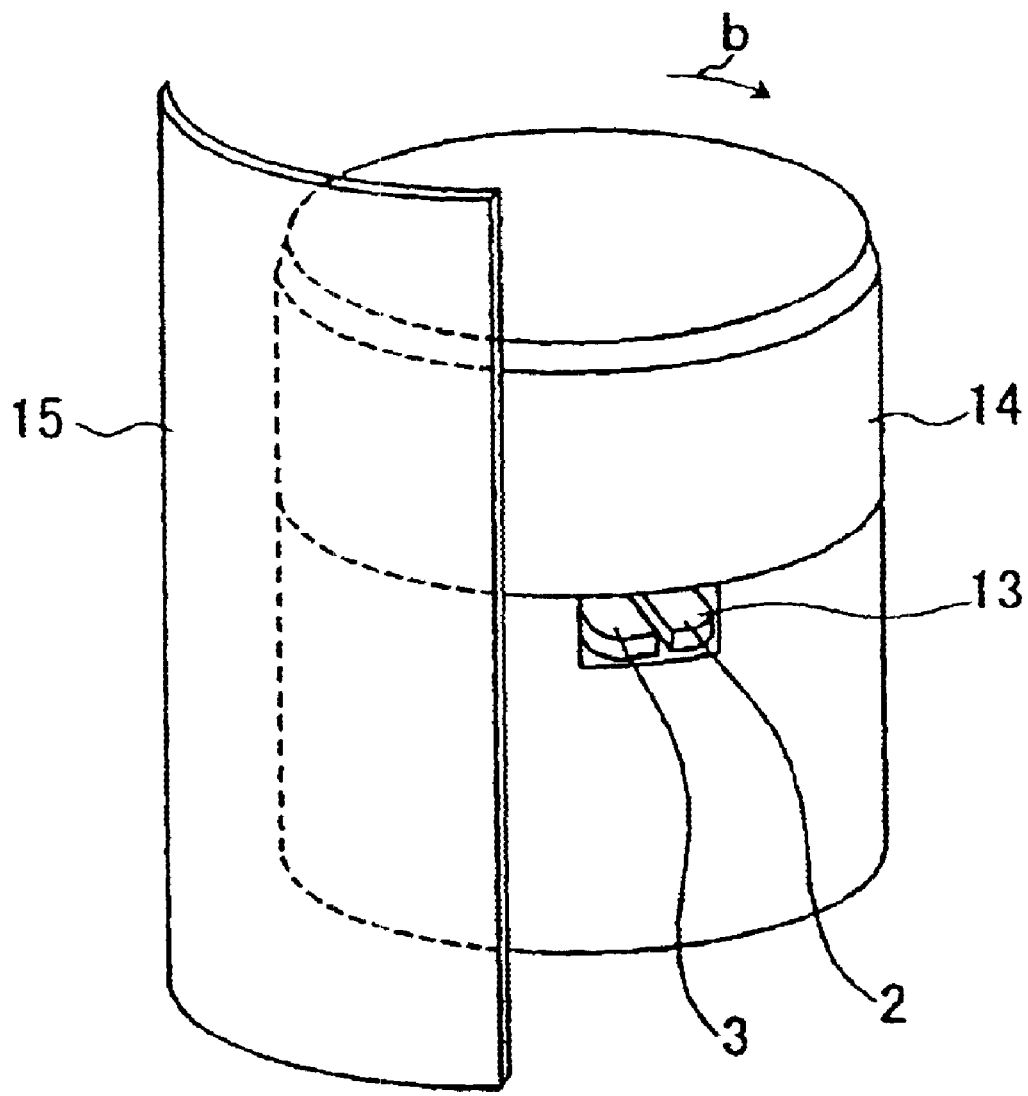
FIG. 5 is a perspective view showing an example of a process for grinding a head unit.

More specifically, as explained with reference to FIGS. 3 and 4, in the chip 3 as an example, the vertex 12 as a reference used to indicate the distance Bo corresponds to the center of the contour lines 10 of the curved surface 13$a$ when the head gap 8a is seen from an extension of the straight line 11 extending between the head gap 8a and the rotation center 9 of the rotating cylinder.

As a consequence, in the case where the chip-fixing angle is adjusted so that a distance between the center of the contour lines 10 of the curved surface 3a when the head gap 8a is seen from the extension of the straight line 11 and the head gap 8a is a required value of Bo1, and in this state, the bonding of the chips to the base is completed, the required value of Bo1 can be obtained with high accuracy, variations in Bo2 can be reduced, and a sufficiently high yield can be secured. Incidentally, the center of the contour lines 10 can be measured with an interference-fringe measuring instrument.

Furthermore, in the foregoing example, the case of using the formula (2) was described. However, Bo1 can be determined likewise in the cases of using the formulae (1) and (3). In such cases, average values of the head relative heights Y of the samples used for the calculation of data for the formulae (1) and (3) are 37.7 $\mu$m and 2.6 $\mu$m, respectively. Accordingly, when the value of the head relative height Y of the head unit is around 37.7 $\mu$m, the formula (1) is selected, and when the value is around 2.6 $\mu$m, the formula (3) is selected.

Furthermore, the value of the head relative height is not restricted to those in the above three cases. A number of different values may be necessary depending on the required VTR format and functions of VTR. Relational formulae prepared in advance through calculations with the value of the head relative height changed to a number of different values can be applied to grinding of various types of head units that vary in head relative height from one another.

Furthermore, the categories of groups shown in Table 1 are indicated as an example. The accuracy of the relational formula can be improved by narrowing the range of values of head relative heights Y in samples in respective groups and increasing the number of samples.

Figure 2:
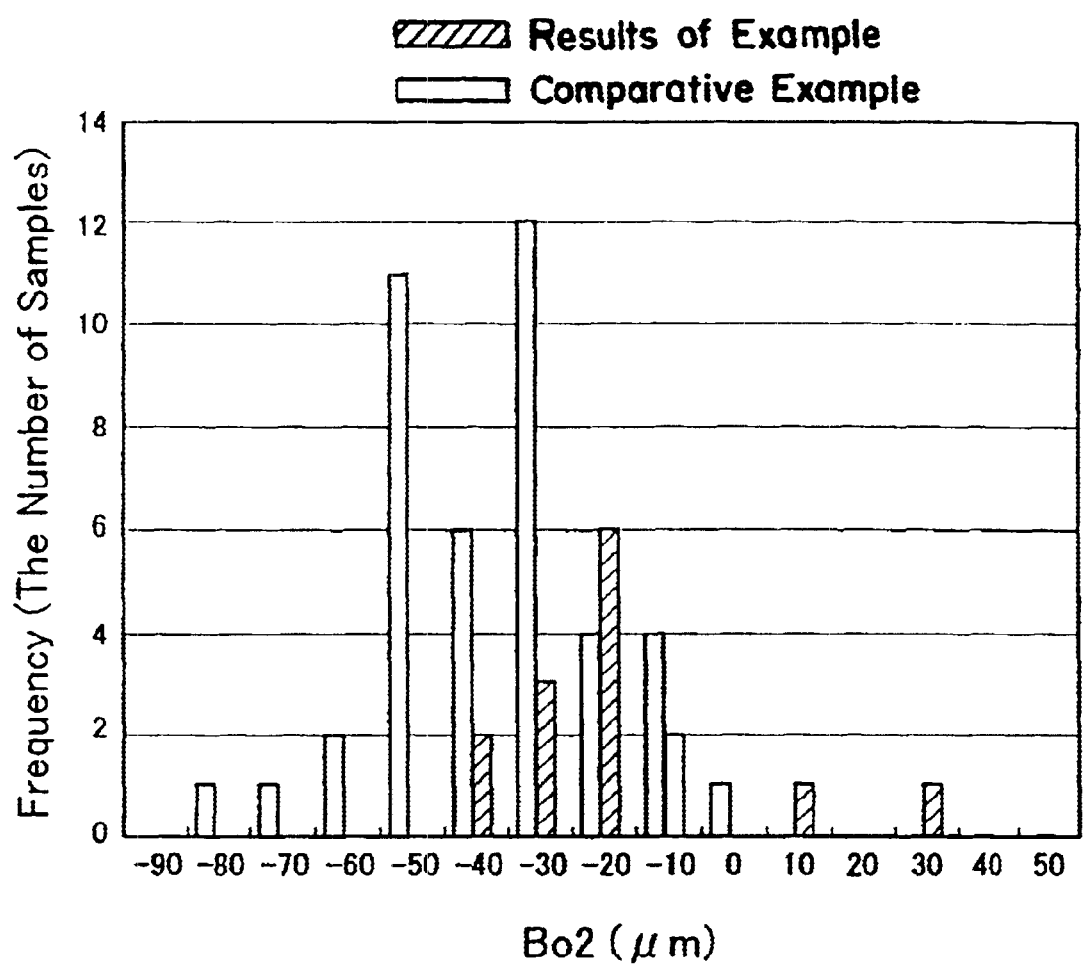
FIG. 2 is a graph showing the comparison between variations in Bo2 in a head unit produced using a manufacturing method according to an embodiment of the present invention and in a head unit produced using a conventional manufacturing method.

FIG. 2 is a graph showing the comparison of variations in Bo2 of head units with a head relative height of 16 $\mu$m between a comparative example (42 samples) in which Bo1 was set to zero and an example (15 samples) in which Bo1 was set to 33.9 $\mu$m that was determined in the foregoing manner. In either case of the example and the comparative example, GD1 and GD2 were set to 20 $\mu$m and 7.5 $\mu$m, respectively, and accordingly the grinding amount $\Delta$GD was set to 12.5 $\mu$m.

In this experiment, since the head relative height Y was 16 $\mu$m, Bo1 in the example was calculated through the formula (2) prepared using samples with the average value of the head relative heights of 17.6 $\mu$m. To be more specific, initially, zero was substituted for Bo and as a result, GD was 11.3 $\mu$m. This value of GD corresponds to a value of GD2. Since the grinding amount $\Delta$GD was 12.5 $\mu$m, the value of GD1 was obtained by adding 12.5 $\mu$m to 11.3 $\mu$m, and thus was 23.8 $\mu$m. When this value of 23.8 $\mu$m was substituted for GD in the formula (2), Bo=33.9 $\mu$m was obtained. This value of Bo corresponds to a value of Bo1.

Accordingly, processing was conducted with Bo1 set to 33.9 $\mu$m in the example and to 0 $\mu$m in the comparative example. In FIG. 2 showing the variations in Bo2, bars with hatching indicate the result of the example and bars without hatching indicate that of the comparative example. The horizontal axis is to show the value of the distance Bo2 ($\mu$m). For instance, -10 on the axis indicates the range of $-10\ \mu m \leq Bo2 < 0\ \mu m$. The vertical axis indicates the number of samples (a frequency) in each range indicated on the horizontal axis.

As the result of the experiment, the average values of Bo2 in the comparative example and that in the example were $-41.3\ \mu m$ and $-21.6\ \mu m$, respectively. This result and the distribution in the graph shown in FIG. 2 show that in the example, the distribution as a whole is shifted towards a side of Bo2=0 as compared to that according to the comparative example, and includes many values close to Bo2=0. In all the samples used in the example, the values of Bo2 fell within the range of standard values, namely, $-50\ \mu m \leq Bo2 \leq 50\ \mu m$, whereas in some samples used in the comparative example, the values of Bo2 were in the range of Bo2<-50 $\mu$m. As described above, according to the method of manufacturing a head unit of the present invention, grinding can be conducted after an optimum value of Bo1 is determined, and thus the accuracy of Bo2 can be improved.

Industrial Applicability

As described above, according to the present invention, grinding of front faces of head chips is conducted after the distance, in correspondence with a target value, between a vertex of a curved surface as a front face of a head and a head gap before the grinding is determined. Consequently, head units falling within the range of standard values can be manufactured efficiently, and accordingly the yield can be improved. Hence, the present invention can be utilized as a method of manufacturing a head unit of a magnetic head to be mounted on a magnetic recording/reproducing apparatus such as a VTR.

What is claimed is:

1. A method of manufacturing a head unit with a plurality of head chips mounted to one base, comprising the steps of:

forming the plurality of head chips, each of the head chips comprising adjacent cores defining a front face and side faces of each of the head chips, the front face including a curved surface having a vertex, a head gap Bo defined as a distance between the vertex of the curved surface and a joint between the cores, a gap depth GD defined as a depth of the joint between the cores measured from one of the side faces of each of the head chips, a value of Bo before grinding being referred to as Bo1 and a value of Bo after grinding being referred to as Bo2, a value of GD before grinding being referred to as GD1 and a value of GD after grinding being referred to as GD2, the difference between GD1 and GD2 being referred to as $\Delta$GD;

mounting the plurality of head chips to the one base so that the curved surfaces of the plurality of head chips are adjacent to each other, the head chips being mounted to the one base so as to have a relative height difference Y with respect to the one base, the relative height difference being defined as a difference in level between two adjacent head chips of the plurality of head chips in a direction orthogonal to a traveling direction of the head chips;

grinding the curved surfaces of the front faces of the mounted plurality of head chips;

determining a value Bo1' for Bo1 that corresponds to a target value Bo2' of Bo2 prior to the mounting and grinding steps, the value Bo1' being determined through a relationship between Bo and GD that is determined with respect to a head unit having a predetermined head relative height value Y', the target value Bo2', and a predetermined value $\Delta$GD' of $\Delta$GD;

wherein the forming step includes forming the plurality of head chips so that each of the head chips has a value Bo that when mounted to the one base in the mounting step is substantially equal to the value Bo1', and has a value Y when mounted in the mounting step that is substantially equal to the value Y', and the grinding step includes grinding the curved surfaces of the plurality of head chips by an amount ΔGD substantially equal to ΔGD'.

2. The method of manufacturing a head unit according to claim 1, wherein the relationship between Bo and GD is predetermined in a form of a characteristic straight line.

3. The method of manufacturing a head unit according to claim 2, wherein the characteristic straight line is a straight line showing a correlation between coordinate axes determined using a distribution of coordinates (GD1, Bo1) and (GD2, Bo2).

4. The method of manufacturing a head unit according to claim 1, wherein the target value Bo2' of Bo2 is zero.

5. The method of manufacturing a head unit according to claim 1, wherein the mounting step includes adjusting a mounting angle of each of the head chips so that Bo1 in each of the head chips is the value of Bo1' corresponding to the target value Bo2' of Bo2.

* * * * *